United States Patent [19]
Nolan

[11] 4,227,771
[45] Oct. 14, 1980

[54] MONOLITHIC OPTICAL WAVEGUIDE HAVING A PLURALITY OF CORES

[75] Inventor: Daniel A. Nolan, Painted Post, N.Y.
[73] Assignee: Corning Glass Works, Corning, N.Y.
[21] Appl. No.: 13,282
[22] Filed: Feb. 21, 1979

Related U.S. Application Data

[60] Division of Ser. No. 840,242, Oct. 7, 1977, which is a continuation-in-part of Ser. No. 809,190, Jun. 23, 1977, abandoned.

[51] Int. Cl.$^3$ .............................................. G02B 5/14
[52] U.S. Cl. ............................... 350/96.33; 65/3 A; 350/96.29; 350/96.30
[58] Field of Search ................ 350/96.29, 96.30, 96.33

[56] References Cited

U.S. PATENT DOCUMENTS

| | | | |
|---|---|---|---|
| 3,976,356 | 8/1976 | Jenkins | 350/96.30 |
| 4,099,835 | 7/1978 | French et al. | 350/96.29 |

FOREIGN PATENT DOCUMENTS 2513861  10/1975  Fed. Rep. of Germany ........ 350/96.30

*Primary Examiner*—Stewart J. Levy
*Attorney, Agent, or Firm*—Walter S. Zebrowski; Richard E. Kurtz

[57] ABSTRACT

A hydrolyzing flame technique is used to build up glass soots of at least two different compositions upon a rotating starting member. The process is repeated until the soots define at least one helically-oriented body of soot of one composition completely enveloped by a soot of a second composition. The soot-covered starting member is then subjected to heat to fuse it whereupon the soots are fused into compositions exhibiting different indices of refraction. The member can then be drawn into a elongate structure comprising an optical waveguide extending helically through the body of the structure.

1 Claim, 4 Drawing Figures

U.S. Patent  Oct. 14, 1980  4,227,771
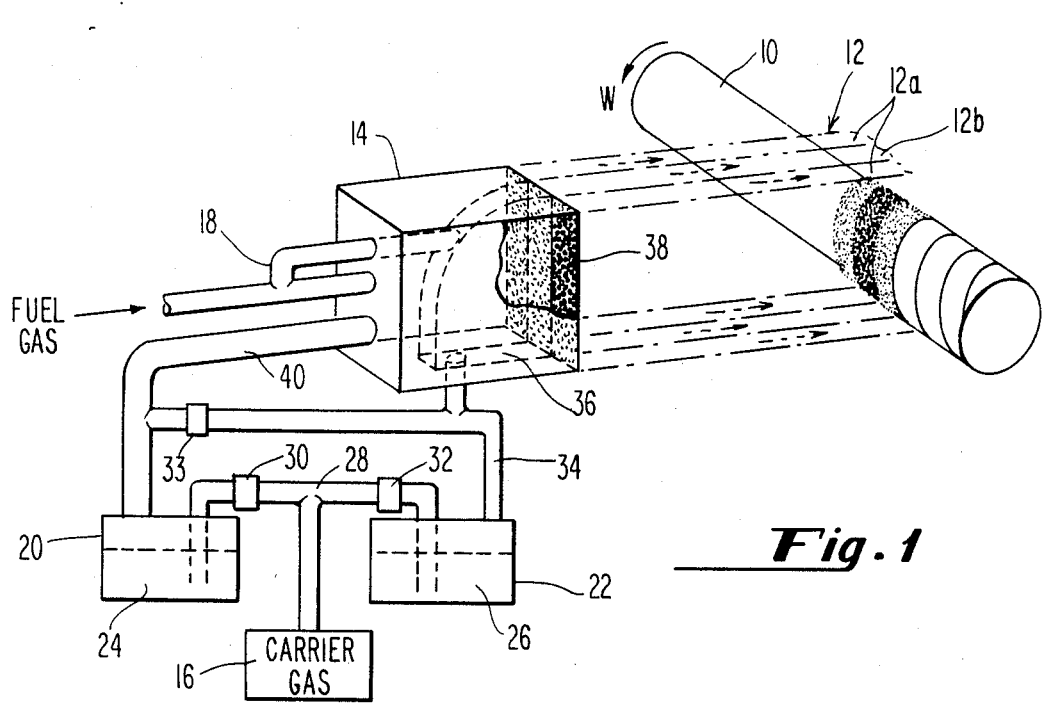
*Fig.1*
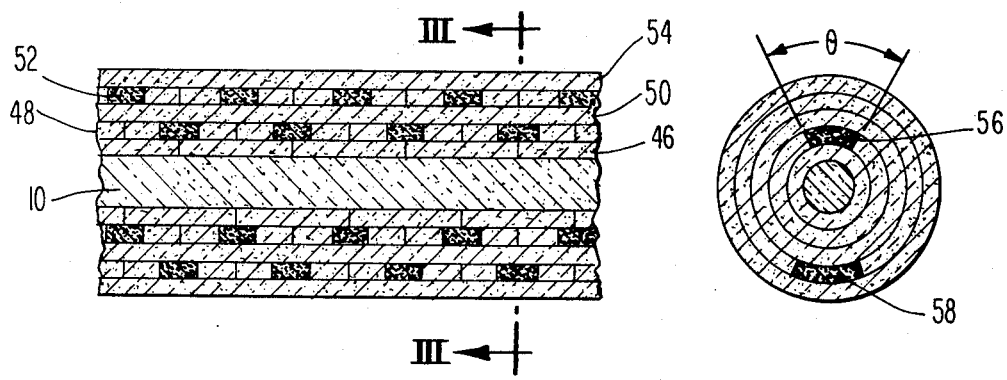
*Fig.2*  *Fig.3*
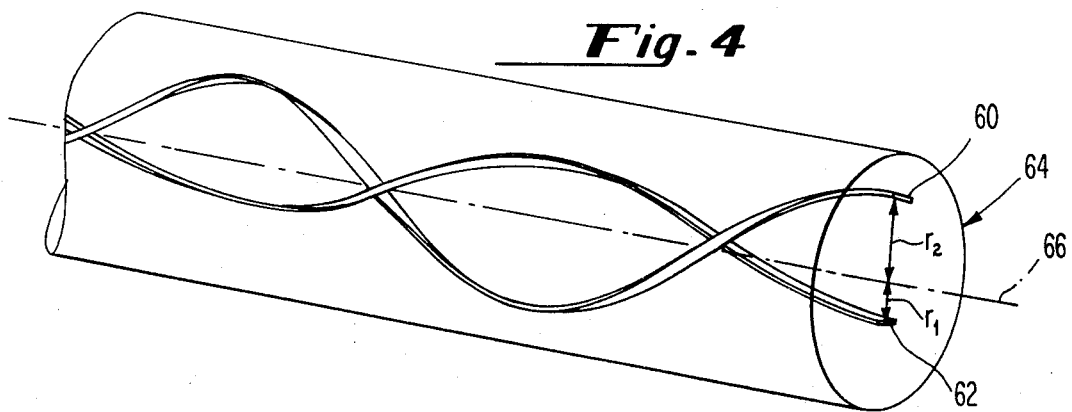
*Fig.4*

MONOLITHIC OPTICAL WAVEGUIDE HAVING A PLURALITY OF CORES

This is a division, of application Ser. No. 840,242, filed Oct. 7, 1977, which is a continuation-in-part of appl. Ser. No. 809,190 filed 6/23/77, now abandoned.

BACKGROUND OF THE INVENTION

The present invention relates to optical waveguides, and more particularly to a method capable of forming a plurality of optical waveguides in a single, monolithic structure.

It has long been known that elongate optical waveguides may be formed by heating a cylindrical blank of transparent dielectric material, such as glass, and drawing the end of the blank into a thin, elongate structure.

According to one currently accepted practice a drawing blank is formed by coating a rotating, cylindrical starting member with a sinterable glass soot. The soot is built up, layer by layer, by traversing the length of the rotating starting member with a hyrolyzing flame. The soot coating is laid down along a spiral locus, the various layers merging together to form a continuum. One such process is described in U.S. Pat. No. 2,272,342 -Hyde and U.S. Pat. No. 2,326,059-Nordberg. In order to provide a cladding exhibiting a different index of refraction than the center portion (core) of the member, a second composition is applied by the hydrolysis technique to complete the process. The second composition, when fused, exhibits a lower index of refraction than the core or first composition, the interface between the compositions serving to define the boundaries of a waveguide within which optical signals may propagate.

It has been recognized that it would be advantageous to provide a number of discrete waveguide cores in a single, monolithic structure, wherein the cores share a common cladding matrix. It has been proposed that discrete core and cladding strands be formed, and the cladding strands placed about the core strand and extruded or otherwise operated upon to form a single monolithic structure. Such an approach is disclosed in U.S. Pat. No. 3,930,714-Dyott. Preforming a plurality of cores having cladding thereon and then drawing the preformed cores together to cause the claddings to fuse is disclosed in the prior art, as for instance in U.S. Pat. No. 2,992,516 - Norton. The formation of a multi-core waveguide from a monolithic drawing blank has not, however, been successfully accomplished by workers in the field.

A further problem which has occurred in the prior art methods of building up successive, spirally-oriented layers of glass soot upon a starting member is the helical pattern which sometimes develops upon the surface of the starting member. Accordingly, it will be appreciated that it would be highly desirable to provide a method for eliminating an uneven buildup of material upon the outer surface of the starting member during a soot deposition process, and to provide a method whereby a plurality of waveguide cores could be formed in a single, monolithic drawing blank.

It is therefore an object of the present invention to provide a method for forming a starting blank embodying a plurality of waveguide core elements.

It is another object of the present invention to provide a method for forming an elongate waveguide structure embodying a plurality of core members.

Yet another object is to provide a method of forming one or more helically-oriented waveguides within a common cladding member.

Another object of the invention is to provide a method of depositing sinterable material upon a starting member in a uniform manner to obtain a substantially ripple-free surface.

Still another object is to provide a waveguide system including one or more helically-disposed core elements enveloped by a common cladding.

SUMMARY OF THE INVENTION

Briefly stated, in accordance with one aspect of the invention the foregoing objects are achieved by providing a cylindrical starting member, and rotating it upon an axis at some frequency w. Two different constituents are prepared in finely divided form to constitute particle streams of differing compositions, and the streams applied to the rotating starting member along a helical locus. The streams comprise glass soots which, when fused, form materials having two different indices of refraction. The stream forming the material with the lower index of refraction is first laid down to form a continuous layer; then the stream of the second composition deposited in a non-contiguous, helical pattern. Finally, the first-composition stream is applied to completely envelop the soot of the second composition, and the resulting structure fused to provide a drawing blank embodying a structure of a relatively high index of refraction which is helically disposed within a matrix having a lower index of refraction.

In a preferred embodiment the constituents are applied by a flame hydrolysis process. The flame converts the constituents into glass soots, and the length of the starting member is traversed by the flame at a velocity in accordance with a specified relationship in order to avoid a helical build-up on the surface of the starting member. The resulting blank can then be heated and drawn to form an elongate waveguide system comprising one or more helically-disposed waveguide cores enveloped in a common cladding.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

FIG. 1 is a schematic illustration of apparatus adapted for practicing the present invention;

FIG. 2 is a cross-sectional view of a drawing blank formed by the method of the present invention;

FIG. 3 is a view of FIG. 2 taken along line III—III; and

FIG. 4 represents a waveguide formed in accordance with principles of the invention.

DESCRIPTION OF A PREFERRED EMBODIMENT

FIG. 1 depicts a starting member 10 rotatably mounted in the path of a flame generally indicated at 12, and issuing from a flame hydrolysis burner 14. A carrier gas such as oxygen or air is supplied to the burner from an appropriate source 16. In accordance with accepted flame-hydrolysis procedures the carrier is passed through a liquid before entering the head of burner 14.

While bubbling through the liquid the gas entrains predictable quantities of a constituent in vapor form. The vapors are intermixed with the carrier gas, and when injected into flame 12 the gas-vapor mixture becomes hydrolyzed to form a glass soot. As used herein, the term "soot" includes particles of silica and its oxides, and dopant materials which are added for the purpose of changing the index of refraction of the glass end product. With present flame hydrolysis techniques the soot is deposited upon the starting member surface in particulate form and the member is later heated to fuse the particles. With other processes, such as inside vapor phase deposition, the soot fuses to the surface immediately and a subsequent fusing step is unnecessary.

First and second tanks 20 and 22 are provided and contain liquid solutions 24 and 26, respectively. The carrier gas from source 16 is introduced beneath the surface of the liquids through an appropriate conduit 28. Valves 30, 32 and 33 allow the flow and distribution of carrier gas through the various liquids to be adjusted.

The carrier gas, entrained with the solutions in finely divided or vapor form, exits from tank 22 and traverses a pipe 34 which is coupled to an enclosed chamber generally designated 36 within burner 14. The enclosed chamber outputs its contents through a series of holes oriented toward the center of the group of outlet holes 38 of burner 14. The gas and entrained material escaping from first container 20 is directed through a second pipe 40 and into burner 14, issuing from apertures lying on either side of the apertures which are served by tank 22.

In order to provide fuel for the hydrolyzing flame a fuel gas, which may be mixed with oxygen or air, is supplied to the inner and outer chambers of burner 14 by way of fuel gas pipe 18. The flame converts the finely divided material into glass soots such as oxides of silica. Depending upon the nature of liquid solutions 24 and 26 the soots may also contain dopant materials which modify the indices of refraction of glass formed by the soots.

It will now be understood that flame 12 may be subdivided into two flame elements having different soot-depositing characteristics. The outer or side members of the hydrolysis flame $12_a$ will deposit a soot whose characteristics are attributable in part to the contents of tank 20. Similarly, the optical characteristics of the soot deposited by central flame $12_b$ are determined by the contents of tank 22. Many materials can be satisfactorily utilized as deposits for affecting the index of refraction of glass formed from the fused flame hydrolysis product. Materials such as oxides of aluminum, germanium, lanthium, nobium, tantalum, tin, titanium and zirconium may be used alone or in combination. The soots which are thus developed leave burner 14 in a stream and are applied to starting member 10 as shown. The starting member is rotated at some frequency w and axially translated with respect to burner 14. Accordingly, a band or strip of soot is deposited on a substantially helical locus along the surface of starting member 10. Unlike the method of the prior art, however, the helical buildup of glass soot provided by the present method is not uniform in character. By choosing appropriate constituents for liquids 24 and 26 the characteristics of the soot streams, and more particularly the indices of refraction of the glasses formed by fusing these soots, can be precisely controlled.

As is known by those skilled in the art, the soot from hydrolysis burner 14 is progressively built up upon starting member 10 in a series of thin layers. By controlling the traversing speed v and rotational frequency w of the starting member, however, accurate registration of the soot streams one upon another can be assured much in the manner that a thread is machined upon a shaft.

By repeating the soot depositing operation a sufficient number of times a helical strip of soot having a second composition can be formed along the surface of the starting member. This spiral or helix is non-contiguous, that is, successive turns of the strip of second material do not touch one another but rather successive turns of the soot of the second type are spaced by intervening helices of soots of the first type.

By closing valve 32 the introduction of the vapors of the second liquid 26 may be discontinued. By thereafter opening valve 33 a single, uniform flame may be produced from burner 14 which embodies characteristics of only the materials of liquid 24. Accordingly, uniform or non-uniform soots can be produced at will.

By repeatedly depositing layers of a soot of the first composition along the surface of starting member 10 a homogeneous, overlying layer can be formed which covers the helix of the second type of soot. If desired, an appropriate thickness of the first type of soot may be deposited upon the starting member 10 before the second soot is applied. In this fashion a helical strip of soot of the second type is enveloped by a soot of the first type. By sintering or fusing the thus-formed element a glass blank may be produced which embodies a length of a second type of glass spirally embedded within a matrix of a first type of glass.

It should now be apparent that the above-described process may be repeated a number of times, so that successive helixes of the second soot can be formed, separated by intervening layers of soot of the first type. In this manner drawing blanks can be formed having a plurality of helically-extending members of glass of a second type embedded in a cylindrical matrix of glass of a first type.

The layers of glass soot can be formed by a variety of methods including but not limited to radio frequency spattering, chemical vapor deposition processes, depositing a glass frit, applying the soot as a suspension in a resinous vehicle, and the like. Particularly when applying successive layers of soot to the inside surfaces of a hollow starting member, the chemical vapor deposition process (sometimes termed inside vapor phase oxidation) may be used. With this technique one or more streams of soot, carried in a stream of hot oxygen, are directed against the inner surface of the member and heat is applied to the outer surface to cause the soot to fuse to the member. In this case a subsequent fusing step will be unnecessary.

In order to minimize the helical undulations in the surface of a blank formed in accordance with the teachings of the present invention, where the concentration of the deposition stream is substantially uniform, surface undulations can be prevented by causing the blank to undergo an integral number of revolutions each time the deposition stream traverses a distance equal to its own width. Depending upon the nature of transverse variations in the concentration of the stream, it may in some cases be desirable to cause the blank to describe less than an integral number of revolutions during the time required for the stream to move an axial distance on the blank equal to its own width.

For streams exhibiting a generally trapezoidal distribution of deposited material, the trapezoid having a base width B and a top width b, the appropriate number of revolutions N to be described by the blank while the stream traverses its own width B is $$N = \frac{2B}{B + b}$$

Other relationships may be developed in accordance with the foregoing in order to prevent undulations or irregularities in the blank surface. Although the specific relationship between the traversing speed of the deposition stream and the rotation of the blank may be varied depending upon the pattern of distribution of material in the stream, it is preferred that the material distribution be constant across the stream. In this case, as described above rotating the blank an integral number of revolutions for each stream width traverse produces the desired effect.

Referring now to FIG. 2, there is shown in idealized form a cross-section taken along the axis of a cylindrical glass drawing blank. The blank is formed upon starting member 10 which may be either solid as shown in the Figure, or tubular. As known to those skilled in the art starting member 10 is formed of a glass of any convenient type, and can be removed after sintering of the blank by well-known methods such as core drilling or acid etching.

Deposited upon starting member 10 is a first, inner layer 46 formed of a soot of a first type. Such soot may be considered to have been formed from soot doped with vapors from liquid 24 and exhibits a first, lower index of refraction. In forming a succeeding, second layer 48 the hydrolyzing flame used to build up the starting member comprises soot streams of both the first and second type. Accordingly, the second layer of the blank is comprised of contiguous, helically-disposed strips of soot of both the first and second kind. The second soot stream, being doped with vapors from liquid 26, when fused produces a glass exhibiting an index of refraction which is higher than that of fused products of the first type of soot.

It should herein be noted that rather than simultaneously forming helixes of soots of both the first and second kind, as shown in FIG. 1, it is fully within the scope of the present invention to form the alternating soot helixes sequentially rather than simultaneously. It may, for example, be convenient to deposit a soot stream of the second type upon starting member 10 in the manner of a non-contiguous, helical strip. Subsequently a soot stream of the first type can be laid down upon the starting member, filling the area on the starting member lying between successive turns of the second soot stream. Prolonged application of the first soot stream will then envelop the second soot to yield a structure substantially similar to that depicted in FIG. 2.

FIG. 2 illustrates two separate helixes of the second soot disposed in different concentric soot layers. Accordingly, layer 48 is first covered by a succeeding layer 50 of soot of the first kind, then a helix of a second soot deposited in radially outer layer 52. Between turns of the second soot, a stream of soot of the first type is deposited in order to form a substantially even deposit. Finally, an outer coating 54 of a first soot is provided to fully envelop the helix formed by the second type of soot.

A cross-sectional view of a blank formed in the above-described manner is shown in FIG. 3. The various layers surrounding starting member 10 are concentric, and predominantly comprised of soot of the first type. A transverse section of soot of the second type is, however, visible. Upon fusing the second material forms a first waveguide core 56 which is disposed in layer 48, and a second waveguide core 58 which lies in layer 52. The width of each core may be controlled by varying either or both the rotational speed of the starting member and the traversing velocity v of the hydrolyzing burner. Thus even with a comparatively large hydrolyzing flame a ribbon of core material can be deposited to define a narrow or a wide waveguide core. Accordingly, the angular width $\theta$ of any given waveguide core can be varied over a wide range and may, if desired, exceed 180°. Further, the cross-sectional proportions of the core can be controlled to enhance signal propagation in selected modes, and also to modify the mode coupling characteristics of the core.

The cross-sectional area of each of the waveguide cores is determined in part by the pitch of the helix which forms it. Hence, it will be apparent to those skilled in the art that the pitch may readily be varied by changing the rotational speed w of the starting member with respect to the translational velocity v of the hydrolyzing flame. It is important that the relationship between the traversing speed of the flame and the rotational frequency of the starting member be controlled for other reasons, however. In particular, it has been found that under some circumstances surface undulations in the form of an unwanted helical buildup arise upon a blank during the soot deposition process. This phenomenon is due to the uneven deposition of soot by the hydrolyzing flame, and the present inventor has found that the situation can be corrected by a proper selection of certain process parameters.

In a typical deposition process the height of the soot stream is greater than the diameter of the blank, so that soot is collected in an area extending over substantially half the circumference of the blank. As the hydrolyzing flame passes down the rotating blank at some velocity v soot may not be deposited, or may be lightly deposited, upon certain portions of the blank surface. As the burner re-traverses the blank it may lay soot upon an area which was missed upon the first pass, in which case a relatively smooth surface will be achieved. On the other hand it may reinforce the previous, thick deposits while adding little to "low" areas. The present inventor has determined that the smoothest possible concentration profile developed after a number of passes can be achieved by satisfying the relationship $$w = \frac{(n + \frac{1}{2})v}{2l} \tag{1}$$

where w is the rotational frequency of the blank, n is an integer, v is the translational velocity of the hydrolyzing flame with respect to the blank, and 1 is the axial length of the blank.

For example, if $l = 300$ cm. and $v = 1.7$ cm/second, a good choice for w would be $$w = \frac{600.5 \ (1.7 \ cm/sec)}{600 \ cm} = 1.7014 \ rev/sec. \tag{2}$$

If n is a non-integer, for instance 599.5, w would be $$w = \frac{600 \, (1.7 \text{ cm/sec})}{600 \text{ cm}} = 1.7 \text{ rev/sec.} \quad (3)$$

From the above expressions it will be recognized that the difference between acceptable and non-acceptable rotational frequencies may be only about 0.1%. Obviously, rather than changing the value of w certain of the other parameters (such as blank length) may be changed. In the previous examples, rather than modifying w to statisfy Equation (1), the length of the starting member could have been changed. In this case, for values of w equal to 1.7 rev/sec and v of 1.7 cm/sec, a good choice for the length l would be 300.25 cm. while a poor choice would be 300 cm. Thus the difference in length between the good and poor choices which produce smooth and undulating surface configurations, respectively, would be only 0.25 cm. In accordance with Equation (1) it will be seen that the difference between acceptable and unacceptable parameters becomes less and less as the ratio of w to quantity v/l increases.

Turning now to FIG. 4, there is shown a waveguide system formed from a drawing blank of the type depicted in FIGS. 2 and 3. As is familiar to those skilled in the art by heating a blank to an appropriate temperature the blank may be drawn into an elongate, fine strand whose length is several orders of magnitude greater than the length of the blank. The structural characteristics of the blank are, however, maintained within the strand although distorted in accordance with the radically different length-to-diameter proportion of the drawn structure. For example, a waveguide core disposed in a helix having a pitch of four inches in a blank might exhibit a pitch of 1000 feet after the blank is drawn. Accordingly the proportions of FIG. 4 are not strictly correct, the pitch of the waveguide cores 60, 62 within the enveloping cladding member 64 being exaggerated for purposes of illustration.

From the Figure, it will be apparent that each of the waveguide cores is oriented along a helical locus disposed about the longitudinal axis 66 of the waveguide system. In the waveguide system depicted the helix defined by core 60 lies at a radius $r_2$ from the axis 66 while core 62 is at a somewhat lesser radius $r_1$. It will be recognized, however, that it may be convenient to form both waveguide cores at a common radial distance from the axis; or to form them at different radii, as shown, but formed substantially in phase with one another so that at any point along the waveguide the cores terminate along a common radial line. Many other combinations and orientations of waveguide cores within a common cladding may be implemented using the teachings of the present invention, and it should be recognized that the depicted embodiments are set forth by way of example and not limitation.

It will now be recognized that there has been described herein a novel waveguide system and method of forming it whereby a plurality of waveguide cores are formed in a single, monolithic drawing blank. As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. An elongate optical waveguide system having a longitudinal axis and adapted to support the propagation of electromagnetic signals along the length thereof, comprising:

a core member formed of a dielectric material having a first index of refraction and disposed in a helical locus about said axis;

a second core member formed of a dielectric material spaced in a helical locus about said axis substantially concentric with said first core member, said second core member being disposed radially outwardly of said first core member;

a cladding member formed of a dielectric material having an index of refraction less than the index of refraction of said core members and enveloping the helix defined by each core member.

* * * * *